United States Patent

Bornemann et al.

Patent Number: 5,261,312
Date of Patent: Nov. 16, 1993

[54] ARRANGEMENT AND METHOD FOR FIXING A TRAVEL SENSOR IN A VACUUM BRAKE POWER BOOSTER

[75] Inventors: Horst Bornemann, Hofheim; Albin Loew, Karben, both of Fed. Rep. of Germany

[73] Assignee: Alfred Teves GmbH, Frankfurt am Main, Fed. Rep. of Germany

[21] Appl. No.: 889,033

[22] Filed: May 26, 1992

[30] Foreign Application Priority Data

May 23, 1991 [DE] Fed. Rep. of Germany ....... 4116779

[51] Int. Cl.⁵ .............................................. F15B 9/10
[52] U.S. Cl. ................... 91/376 R; 92/98 R; 29/889.5
[58] Field of Search ............... 91/369.1, 369.2, 369.3, 91/376 R; 92/96, 98 R, 99, 101, 48, 49, 5 R; 29/889, 889.5

[56] References Cited

U.S. PATENT DOCUMENTS

| Re. 28,191 | 10/1974 | Kytta et al. | 91/376 R |
| 3,470,697 | 10/1969 | Pech et al. | 91/369.1 |
| 5,005,464 | 4/1991 | Takaku | 91/369.1 X |
| 5,117,738 | 6/1992 | Horner, Jr. | 91/376 R X |

FOREIGN PATENT DOCUMENTS

| 3918012 | 6/1990 | Fed. Rep. of Germany. |
| 4011165 | 10/1991 | Fed. Rep. of Germany. |
| 2625156 | 6/1989 | France | 91/369.2 |
| 0026156 | 2/1987 | Japan | 91/369.2 |

*Primary Examiner*—Edward K. Look
*Assistant Examiner*—Hoang Nguyen
*Attorney, Agent, or Firm*—Robert P. Seitter; J. Gordon Lewis

[57] ABSTRACT

A vacuum brake power booster (1) has an electric travel sensor (3) for monitoring the position of a movable wall (4) furnishing the boosting power of the brake power booster. The travel sensor (3) is mounted by a sensor receptacle (2) which is made of plastic material and which is sealed off with respect to the booster housing (10) by means of a seal. In order to assure effective sealing by creating a constant degree of compression of the seal (7) despite different material thicknesses of the booster housing (10), angled tabs (12) are formed against which locking projections (11) are abutted.

3 Claims, 2 Drawing Sheets

ARRANGEMENT AND METHOD FOR FIXING A TRAVEL SENSOR IN A VACUUM BRAKE POWER BOOSTER

BACKGROUND OF THE INVENTION

The invention is related to a vacuum brake power booster of a known type having a booster housing, preferably made of sheet or plate metal and with an electrical travel sensor for monitoring the position of a movable wall furnishing the boosting power, the sensor fixed in an opening providing in the booster housing by means of a sensor receptacle which is formed with locking projections extending out from the periphery of the opening and which is sealed off with respect to the booster housing by means of an elastic seal.

A reliable sealing of the sensor receptacle with respect to the booster housing is of prime importance for a smooth functioning of the brake power booster. A force acting on the seal is required which leads to a deformation of that seal and depends in part, on the thickness of the material of which the booster housing is formed. In order to eliminate the effect of the material thickness, a two-part sensor receptacle has been devised whose parts are coupled to each other by means of a threaded connection so as to be adjustable. The considerable manufacturing and assembly costs of this complex, prior-art sensor receptacle is a disadvantage.

It is therefore, the object of the present invention to improve a vacuum brake power booster by providing a sensor receptacle allowing manufacture and assembly at low cost but which is universally applicable for different material thickness of the booster housing.

SUMMARY OF THE INVENTION

According to the invention, this object is achieved in that means are provided for the booster housing opening which ensure a constant compression of the seal notwithstanding different material thicknesses of the booster housing.

These means are constituted by partially formed angled tabs which interact with locking projections. The height of the angled tabs corresponds preferably to the distance between an annular surface on the sensor receptacle serving as an abutment surface for the external marginal range of the opening, and the front surface of the locking projections which interact with the internal periphery of the opening.

In order to ensure a correct positioning of the sensor receptacle during mounting, a radial recess or groove may be provided in the periphery of the opening, which in the assembled condition accommodates a guide projection being molded to the sensor receptacle.

Further details and advantageous features of the invention will be revealed by the following description of one embodiment, making reference to the accompanying drawing.

DETAILED DESCRIPTION

Figure 1:
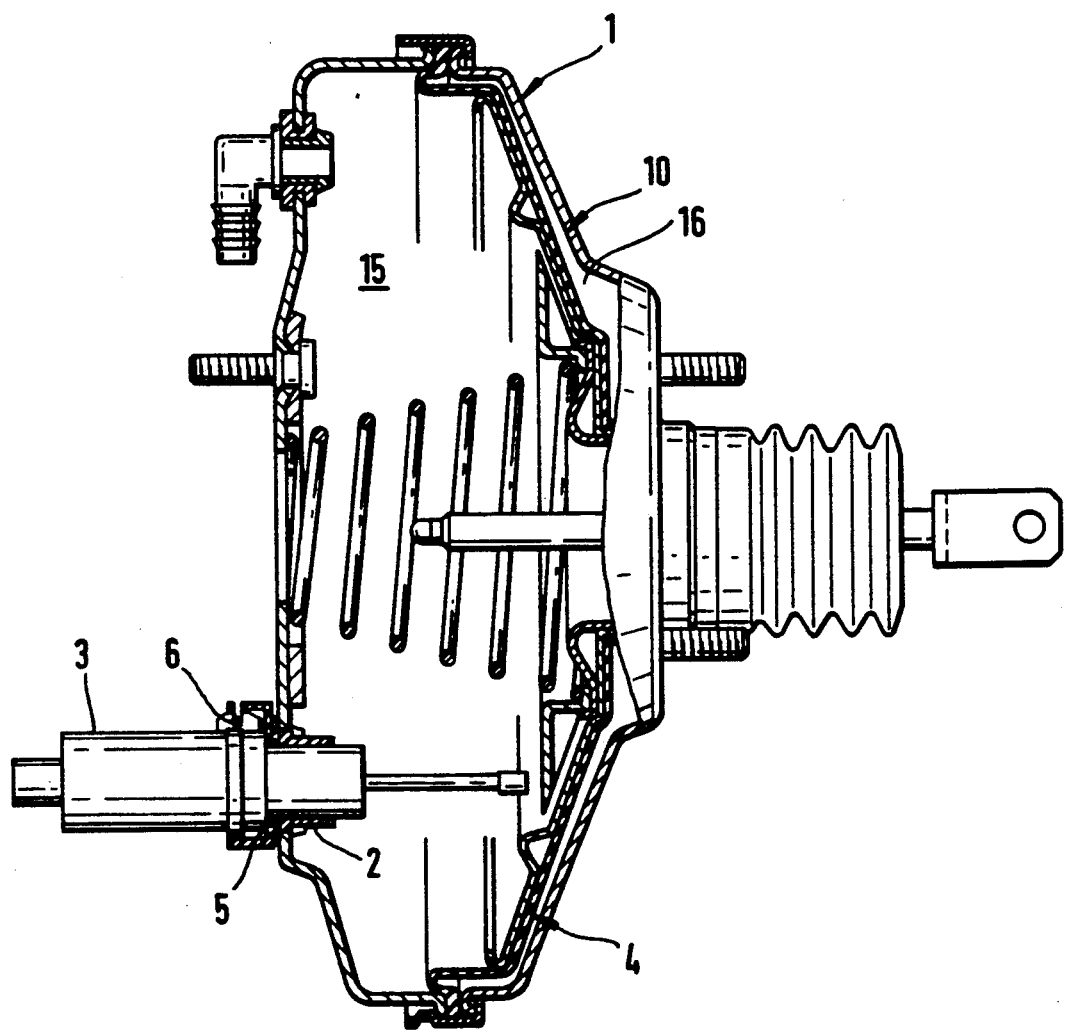
FIG. 1 shows an inventive vacuum brake power booster in a partial section in axial direction.
Figure 2:
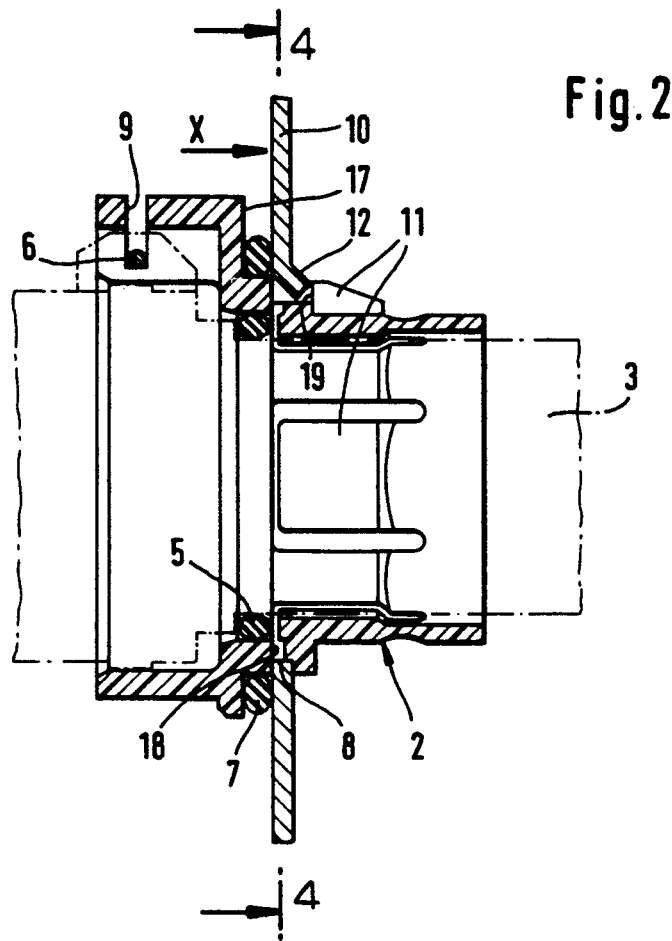
FIG. 2 shows a sensor receptacle positioning the travel sensor in an axial section.
Figures 3, 4:
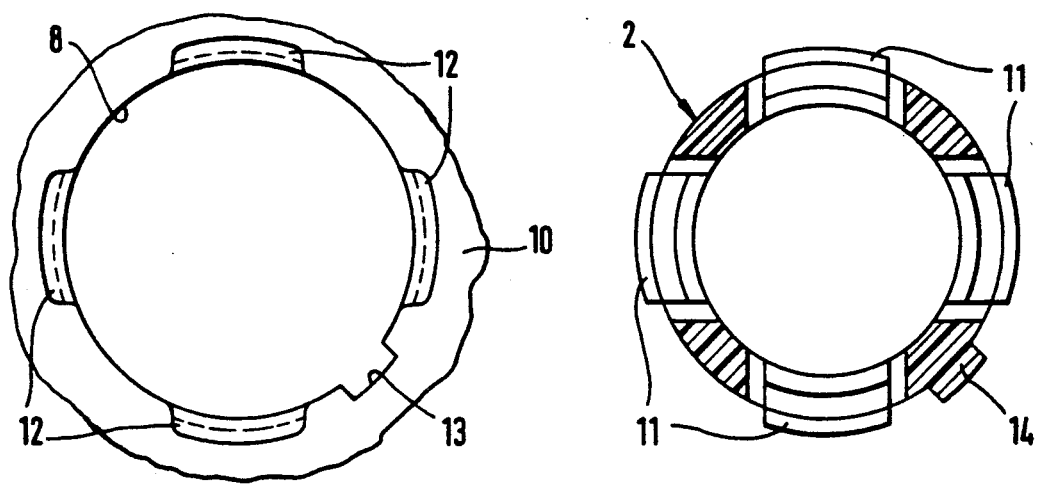
FIG. 3 shows a fragmentary end view of the opening provided in the booster housing, in the direction X in FIG. 2.
FIG. 4 shows a cross section through the sensor receptacle along the sectional line 4—4 in FIG. 2.

The assembly which is illustrated in the drawing is composed of a vacuum brake power booster 1 whose booster housing 10 of formed metal is subdivided by an axially movable wall 4 into a vacuum chamber 15 and a ventable power chamber 16. An electrical travel sensor 3 is provided in order to monitor the position of the movable wall 4. The booster housing half which defines the vacuum chamber 15 and which is shown on the left, is furnished at its bottom with an opening 8 (FIG. 2). A sensor receptacle 2, preferably made of plastic material, is inserted which accommodates the travel sensor 3 mentioned above. As will be appreciated in particular from FIGS. 2 and 4, the sensor receptacle 2 is provided, in a part projecting into the interior space of the booster housing 10, with a plurality of locking projections 11, which in the assembled condition of the sensor receptacle 2 within the booster housing 10 extend radially outwardly of the opening 8.

An efficient sealing of the sensor receptacle 2 with respect to the booster housing 10 is provided by an elastic seal, preferably in the form of an O-ring 7, which is clamped in between the outer surface of the booster housing 10 and a facing annular surface 17 on the sensor receptacle 2.

In order to fix the travel sensor 3 within the sensor receptacle 2, the sensor receptacle 2 is provided in with a radial circumferential groove 9 a portion positioned outside the booster housing 10 which groove 9 accommodates a retaining ring 6 securing the travel sensor 3. A sealing ring 5 is positioned within the sensor 3 with respect to the sensor receptacle 2.

In order to ensure an effective sealing of the sensor receptacle 2 with respect to the booster housing 10, the O-ring 7 must be subjected to the effect of a constant compressive force which force has to be the same despite of different metal thicknesses of the formed booster housing 10. To obtain this effect, a plurality of partially formed tabs 12 (FIGS. 2, 3) are provided at the booster housing 10 disposed about the periphery of the opening 8 which interact with the locking projections 11 of the sensor receptacle 2 and which so ensure a uniform compression of the O-ring 7. In this configuration, the height of the formed tabs 12 corresponds preferably to the distance between an annular surface 18 which is formed on the sensor receptacle 2 and which abut against the surface around the periphery of the opening 8 in the mounted condition. The front surface 19 of each of the locking projections 11 are abutted against the outside of the formed tabs 12.

In order to locate the sensor receptacle 2 in the correct orientation when mounting the sensor receptacle 2 is furnished with a radial guide projection 14 which is accommodated by a groove 13, which is provided in the periphery of the opening 8. This locates the locking projections 11 in alignment with the formed tabs 12.

We claim:

1. An arrangement for fixing a travel sensor in a vacuum brake power booster with a booster housing of formed metal, a movable wall in said booster housing, and an electrical travel sensor for monitoring the position of said movable wall, said power booster including fixing means for fixing said sensor in an opening in a wall of said booster housing, said arrangement for fixing said travel sensor comprising a sensor receptacle having an annular surface adapted to be positioned opposing a portion of one side of said booster housing wall surrounding said opening and another portion adapted to be fit within said opening to pass through said opening to the other side of said booster housing wall, said another portion formed with locking projections extending radially outwardly of the periphery of said opening, an annular elastic seal interposed between said receptacle annular surface and said portion of said one side of said booster housing wall, sealing said receptacle to said one side of said booster housing wall, a plurality of angled tabs formed in said booster housing about said periphery, each angled tab of said opening aligned with a respective locking projection, said tabs each having a tip located at a uniform fixed distance from a surface of said housing wall, said tips engaged by said locking projections upon compression of said seal to a predetermined degree, whereby a uniform compression of said seal is established despite any different thicknesses of said booster housing wall at said opening.

2. An arrangement as claimed in claim 1, wherein said opening is formed with a radial groove and a guide projection on said another portion of said sensor receptacle intermediate said projections, said guide projection configured to be fit into said groove upon installation of said sensor receptacle into said opening, whereby said angled tabs are aligned with said locking projections.

3. A method of mounting a receptacle in an opening in a wall of any of a series of housings in which said wall is of a different thickness, so that a seal interposed between any of said wall of said one side of the housing and said seal is compressed uniformly notwithstanding said different wall thickness, comprising the steps of forming a series of angled tabs in said wall arranged about the periphery of said wall opening, forming each of said tabs with a tip extending from the other side of said wall and locating said tips a fixed distance from the surface of said one side of said wall, said fixed distance being the same for every wall thickness, and retaining said receptacle against said one side of said wall with said seal interposed to be compressed therebetween with a series of radial projections on said receptacle, by aligning each locking projection with a respective angled tab and thereby engaging said tips of said angled tabs with said locking projection, whereby said fixed distance establishes a uniform compression of said seal despite said variations in wall thickness.

* * * * *